(12) United States Patent
Kellerman et al.

(10) Patent No.: US 12,494,625 B2
(45) Date of Patent: Dec. 9, 2025

(54) CABLE BUS MANAGEMENT BLOCK

(71) Applicants: Dallas Kellerman, Belleville, IL (US); Robert Crain, Caseyville, IL (US)

(72) Inventors: Dallas Kellerman, Belleville, IL (US); Robert Crain, Caseyville, IL (US)

(73) Assignee: Cablofil, Inc., Mascoutah, IL (US)

( * ) Notice: Subject to any disclaimer, the term of this patent is extended or adjusted under 35 U.S.C. 154(b) by 212 days.

(21) Appl. No.: 18/543,016

(22) Filed: Dec. 18, 2023

(65) Prior Publication Data
US 2025/0202209 A1  Jun. 19, 2025

(51) Int. Cl.
*H02G 3/00* (2006.01)
*H02G 3/04* (2006.01)
*H02G 3/06* (2006.01)

(52) U.S. Cl.
CPC ......... *H02G 3/0608* (2013.01); *H02G 3/0456* (2013.01); *H02G 3/263* (2013.01)

(58) Field of Classification Search
CPC ..... H02G 3/0608; H02G 3/0456; H02G 3/263
See application file for complete search history.

(56) References Cited

U.S. PATENT DOCUMENTS

| | | | | |
|---|---|---|---|---|
| 2,318,859 A | * | 5/1943 | Huguelet | H02G 5/025 |
| | | | | 174/70 B |
| 5,992,802 A | | 11/1999 | Capbell | |
| 6,261,037 B1 | * | 7/2001 | Richards | F16L 3/2235 |
| | | | | 410/36 |
| 7,922,012 B2 | | 4/2011 | Sisley | |
| 8,294,030 B2 | | 10/2012 | Pollard, Jr. | |
| 8,757,558 B2 | | 6/2014 | Pollard, Jr. | |
| 10,122,157 B1 | | 11/2018 | Gintz | |
| 10,141,731 B2 | | 11/2018 | Pawluk | |
| 10,547,162 B1 | | 1/2020 | Lukovic | |
| 10,666,029 B2 | | 5/2020 | Jette | |
| 11,585,465 B2 | | 2/2023 | Hanlon et al. | |

(Continued)

FOREIGN PATENT DOCUMENTS

| | | |
|---|---|---|
| CN | 219592062 U | 8/2023 |
| KR | 100590455 B1 | 6/2006 |
| KR | 20180061129 A | 6/2018 |

OTHER PUBLICATIONS

MP Husky, Cable Bus, retrieved from www.mphusky.com/cable-bus/overview 2023.

*Primary Examiner* — Pete T Lee
(74) *Attorney, Agent, or Firm* — Bryan Cave Leighton Paisner LLP

(57) ABSTRACT

A cable bus management block for retaining cables having a housing with a base and two opposing sidewalls extending upward generally perpendicular to the base, and a set of channel rungs attached to the sidewalls and extending upward perpendicular to the base, where each of the channel rungs includes a channel along its length. A cable block spacer assembly sits within the channels of the channel rungs, wherein the cable block spacer assembly has a plurality of apertures through which the cables may be retained. The cable bus management block further includes an upper channel support having a channel for seating on top of the cable block spacer assembly, with a securement bar extending laterally across the cable bus management block between the sidewalls, with the securement bar attached to the channel rungs to hold the cable block spacer assembly in place.

8 Claims, 4 Drawing Sheets

(56) References Cited

U.S. PATENT DOCUMENTS

| | | |
|---|---|---|
| 11,651,869 B2 | 5/2023 | Rouleau |
| 2010/0122863 A1* | 5/2010 | Shoen .................... B62D 25/10 |
| | | 180/69.21 |
| 2014/0175231 A1 | 6/2014 | Cox et al. |
| 2020/0403390 A1 | 12/2020 | Jette |

* cited by examiner

CABLE BUS MANAGEMENT BLOCK

FIELD OF THE DISCLOSURE

The present disclosure generally relates to systems to contain and manage electrical power cables, data transmission lines, and the like. More particularly, the disclosure relates to cable bus support blocks that aid in routing and supporting cables.

BACKGROUND

Cable trays and similar systems are used to support cables and the like which run within buildings such as factories and other industrial sites. One form of a cable tray is a cable bus management block that aids in supporting and routing different forms of cables, including electrical power cables. The cable bus management blocks often include a plurality of stacked support blocks having passages for receiving and retaining cables. In conventional cable bus management blocks, each support block has holes for receiving a bolt or rod to retain the support blocks in place within the cable bus management block. Other forms of cable bus management blocks often require bolts extending into or through the cable block spacers, either vertically or horizontally, which leads to enhanced labor costs and increased installation complexity as the through holes for the bolts or rods must be properly aligned.

Therefore, it is desirable to have a cable bus management block that can readily accommodate support blocks retained therein without the installation complexity of prior art management blocks.

SUMMARY OF THE DISCLOSURE

Among the various aspects of the present invention is the provision of a cable bus management block as substantially shown and described.

One aspect of the disclosure is directed to a cable bus management block that includes a housing having a base and two opposing sidewalls extending upward generally perpendicular to the base. A set of channel rungs is attached to the sidewalls and extends upward perpendicular to the base, with each of the channel rungs having a channel along its length for securing a cable block spacer assembly seated within the channels of the channel rungs. The cable block spacer assembly has a plurality of passages or apertures through which the cables may be retained. In lieu of securing the cable block spacers of the cable block spacer assembly to each other, a securement bar may be placed above the cable block spacer assembly extending laterally across the cable bus management block between the sidewalls, where the securement bar is attached to the channel rungs and holds the cable block spacer assembly in place.

Preferably, the cable bus management block may also include a lower channel support extending laterally across the cable bus management block between the sidewalls and adjacent the base, such that the cable block spacer assembly sits within the lower channel support. In addition, the cable bus management block may have an upper channel support having a channel for seating on top of the cable block spacer assembly and below the securement bar.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

DETAILED DESCRIPTION

The accompanying Figures and this description depict and describe embodiments of a cable bus management block in accordance with the present disclosure, and features and components thereof. It should also be noted that any references herein to front and back, right and left, top and bottom, upper and lower, and first and second are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the figures. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Figure 1:
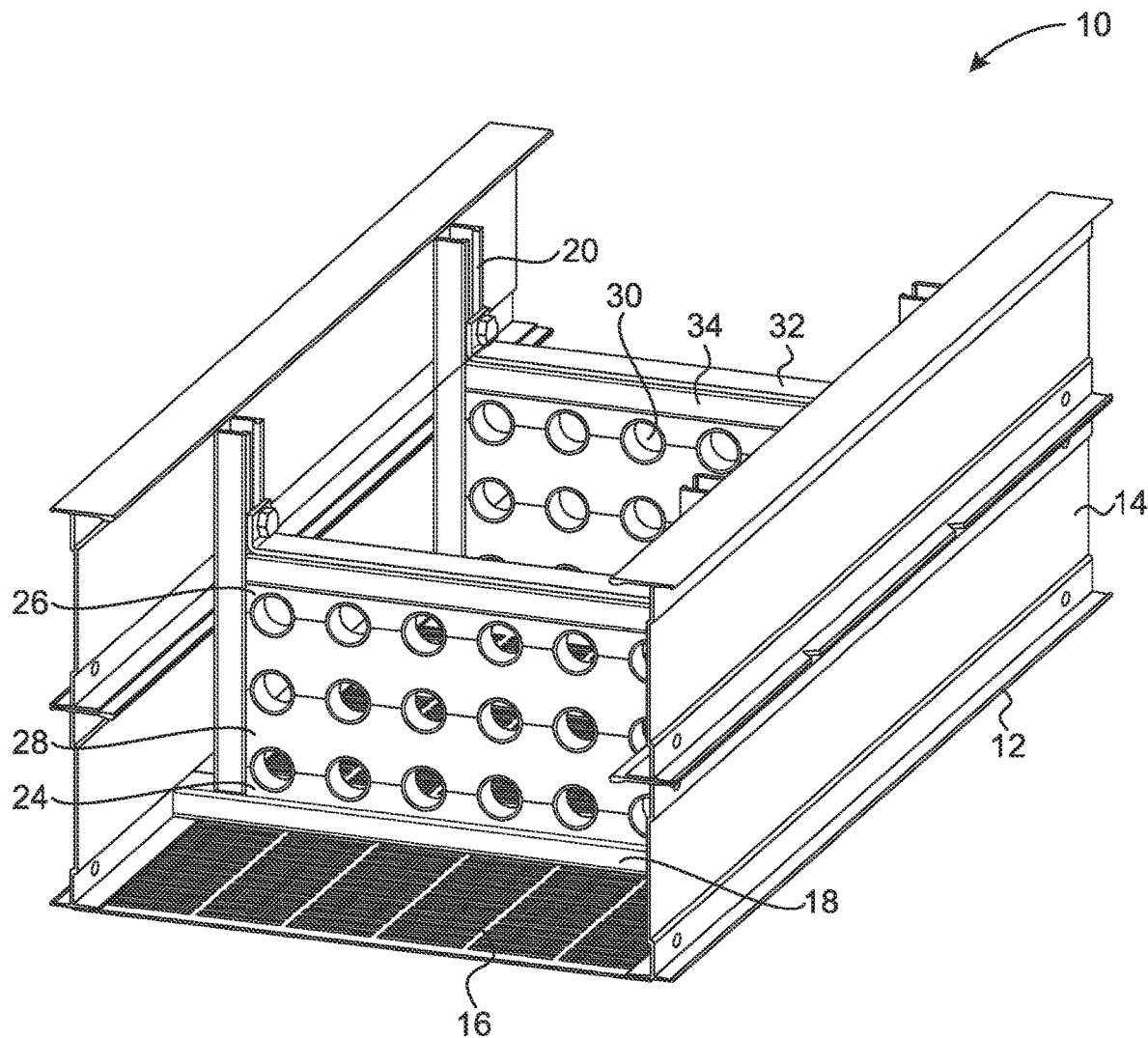
FIG. 1 is a perspective view of a cable bus management block.
Figure 2:
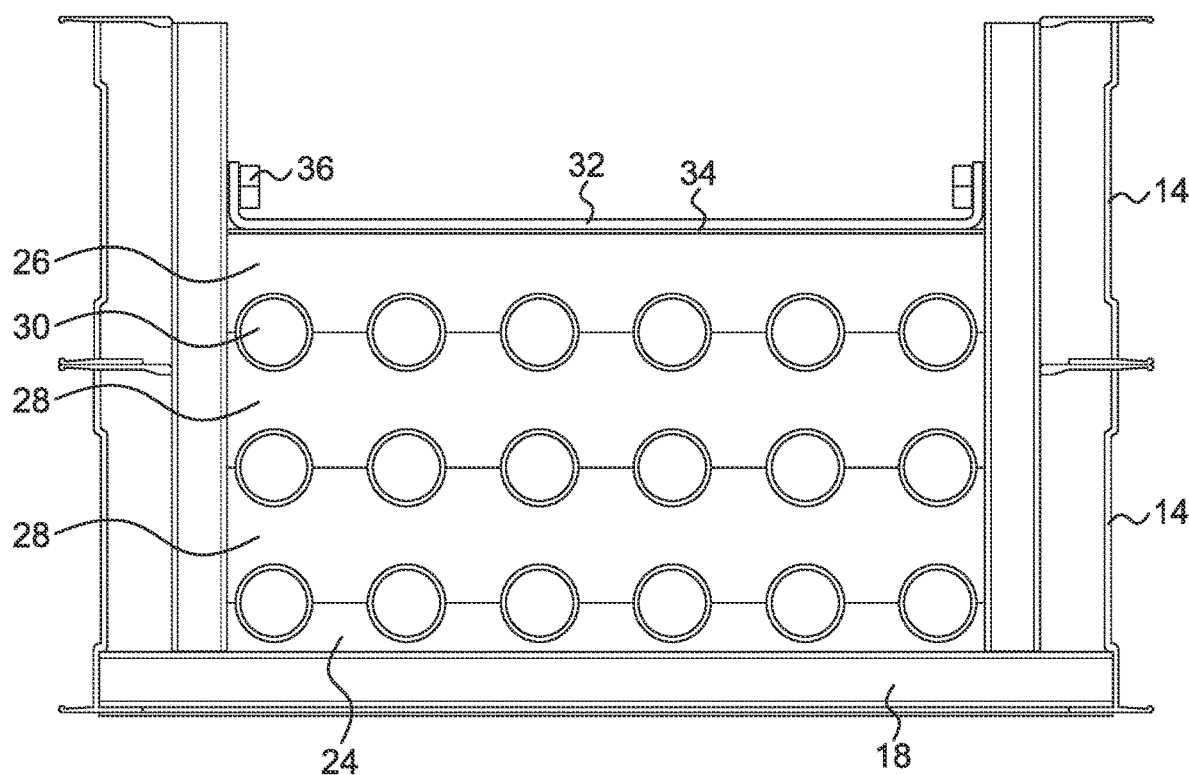
FIG. 2 is a front view of the cable bus management block.
Figure 3:
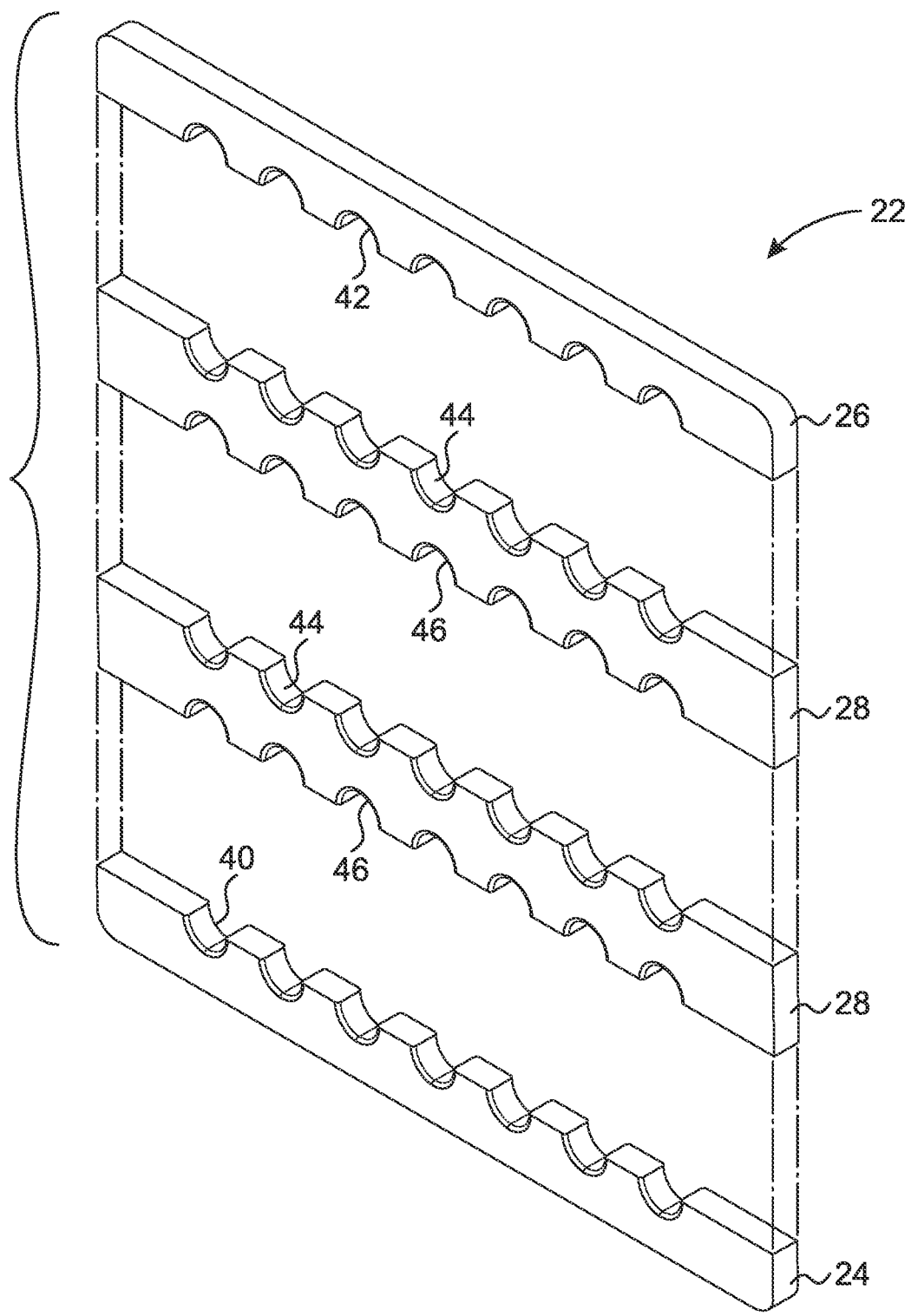
FIG. 3 is perspective view of certain components of the cable bus management block.

With initial reference to FIGS. 1 and 2, a cable bus management block 10 includes housing 12 that includes a base portion 16 and at least two sidewalls 14 extending upward generally perpendicular to the base portion 16. The sidewalls 14 and base portion 16 of the housing 12 may be made of aluminum, steel, or other metals or suitable plastics. Depending on the application, the housing 12 may include more than one set of sidewalls 14 to increase the overall height of the cable bus management block 10 in order to retain additional cables. The housing 12 may be assembled together via welding, soldering, gluing, or bolting the sidewalls 14 to the base portion 16. The cable bus management block 10 also includes a lower channel support 18 having an upwardly facing channel. The cable bus management block 10 further includes a set of channel rungs 20 attached to the sidewalls and extending upward perpendicular to the base, wherein each of the channel rungs 20 includes a channel.

The cable bus management block 10 includes a cable block spacer assembly 22 seated within the channel rungs 20 and the lower channel support 18. The cable block spacer assembly 22 includes apertures 30 for receiving and retaining the cables. The assembly 22 includes a bottom cable block spacer 24, one or more intermediate cable block spacers 28 and a top cable block spacer 26. Preferably, the intermediate cable block spacers 28 are identical to one another. Each of the cable block spacers 24, 26, 28 include cutouts on their top and/or bottom surfaces as shown in FIG.

3. For example, the bottom cable block spacer 24 may have a first set of cutouts 40 on its top surface, the top cable block spacer 26 may have a second set of cutouts 42 on its bottom surface, and the intermediate cable block spacers 28 may have third and fourth sets of cutouts 44, 46 on their top and bottom surfaces. Preferably, the first set of cutouts 40 of the bottom cable block spacer 24 align with the fourth set of cutouts 46 of the intermediate cable block spacer 28 adjacent the bottom cable block spacer 24 and the second set of cutouts 42 of the top cable block spacer 26 align with the third set of cutouts 44 of the intermediate cable block spacer adjacent the top cable block spacer 26. The cutouts 40, 42, 44, and 46 may be of similar shape such as semi-circular as shown in the figures.

The bottom cable block spacer 24 is seated within the channel of the lower channel support 18. The cable block spacers 24, 26, 28 are assembled together by stacking on top of each other such that the cutouts 40, 42, 44, 46 form the apertures 30. During assembly, the cables are seated within the cutouts of a lower cable block spacer prior to installing the next tier of cable block spacers. The sides of each of the cable block spacers 24, 26, 28 are retained within slots of the channel rungs 20 by sliding the cable block spacers into the channel of the rungs 20. In one embodiment, the sides of the cable spacer blocks 24, 26, 28 may narrow in width or depth in the region that slides into the channel rungs 20. The cable spacer blocks 24, 26, 28 may be formed from any suitable material such as high density polyethylene.

Figure 4:
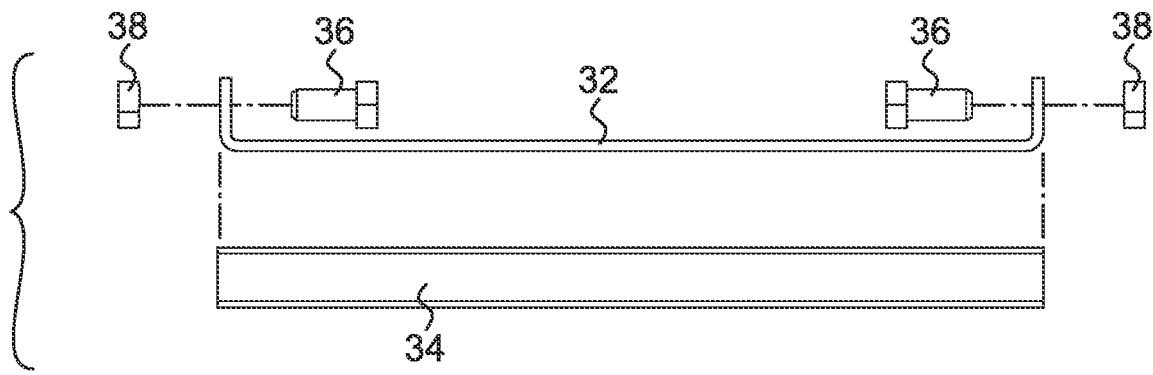
FIG. 4 is a front view of certain components of the cable bus management block.
Figure 5:
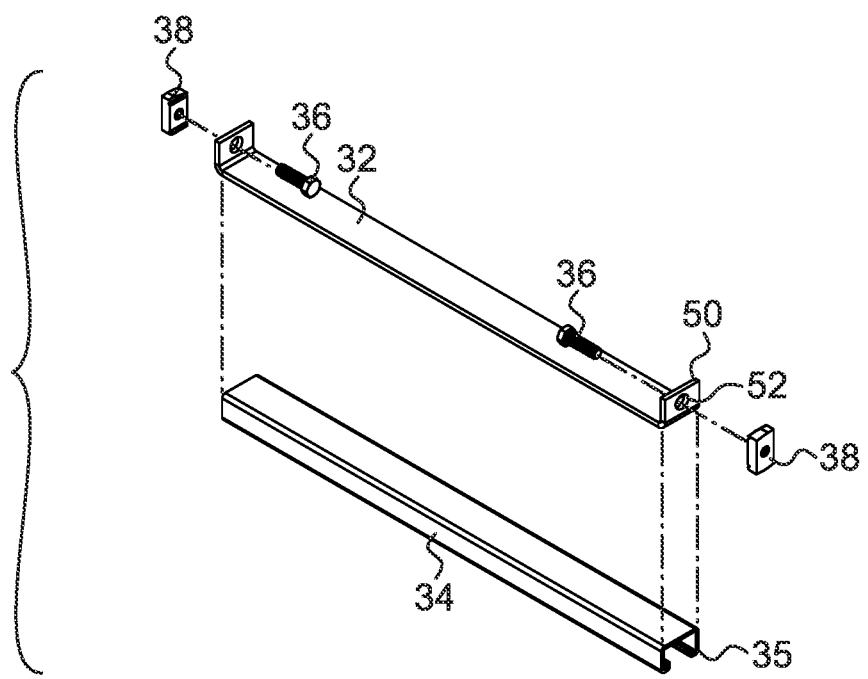
FIG. 5 is a perspective view of the components of the cable bus management block shown in FIG. 4.

As shown in FIGS. 4 and 5, the cable bus management block 10 includes an upper channel support 34 extending between the sidewalls 14 having a channel 35 for seating on top of the cable block spacer assembly, for example, on top of the top cable block spacer 26. A securement bar 32 sits on top of the upper channel support 34. As shown in FIG. 5, each end of the securement bar 32 preferably includes an upwardly-turned portion 50 having an opening 52 permitting the securement bar 32 to be attached to the channel rungs 20 with fasteners passing through the opening. For example, the fasteners may include a bolt 36 having a head and a threaded shank, wherein the head of the bolt 36 is slotted within the channel rungs 20, the shank of the bolt extends through the opening 52 of the securement bar 32, and a nut 38 threaded onto the shank of the bolt 36. Alternatively, the nut 38 may be slotted within the channel rungs 20 and the shank of the bolt 36 passes through the opening 52 of the securement bar 32 and threaded within the nut 38 to retain the securement bar 32 in place, thus securing the cable spacer blocks 24, 26, 28 in place within the cable bus management block 10. In this alternative embodiment, the nut 38 may be square-shaped to engage with the channel of the channel rungs 20 such that the nut 38 stays in place as the bolt 36 is threaded therethrough.

As those skilled in the art will appreciate, modifications and variations are possible without departing the scope of the invention defined in the appended claims. Furthermore, it should be appreciated that all examples in the present disclosure are provided as non-limiting examples.

What is claimed is:

1. A cable bus management block for retaining cables comprising:
   a housing having a base and two opposing sidewalls extending upward generally perpendicular to the base;
   a set of channel rungs attached to the sidewalls and extending upward perpendicular to the base, wherein each of the channel rungs includes a channel along its length;
   a cable block spacer assembly seated within the channels of the channel rungs, wherein the cable block spacer assembly has a plurality of apertures through which the cables may be retained; and
   a securement bar above the cable block spacer assembly extending laterally across the cable bus management block between the sidewalls, wherein the securement bar is attached to the channel rungs and holds the cable block spacer assembly in place.

2. The cable bus management block of claim 1 further comprising a lower channel support extending laterally across the cable bus management block between the sidewalls and adjacent the base, wherein the cable block spacer assembly seats within the lower channel support.

3. The cable bus management block of claim 1 further comprising an upper channel support having a channel for seating on top of the cable block spacer assembly and below the securement bar.

4. The cable bus management block of claim 3 wherein the securement bar comprises an opening on each end and is attached to the channel rungs with fasteners.

5. The cable bus management block of claim 4 wherein the fasteners comprise a bolt having a head and a threaded shank, wherein the head of the bolt is slotted within the channel rungs, the shank of the bolt extends through the opening of the securement bar, and a nut threaded onto the shank of the bolt.

6. The cable bus management block of claim 4 wherein the fasteners comprise a nut and a bolt having a head and a threaded shank, wherein the nut is slotted within the channel rungs, the shank of the bolt extends through the opening of the securement bar, and into the nut to retain the securement bar in place.

7. The cable bus management block of claim 3 wherein the cable block spacer assembly comprises a bottom cable block spacer having a first set of cutouts on its top surface, a top cable block having a second set of cutouts on its bottom surface, and at least one intermediate cable block having third and fourth sets of cutouts on its top and bottom surfaces, wherein the first set of cutouts of the bottom cable block align with the fourth set of cutouts of the intermediate cable block adjacent the bottom cable block and the second set of cutouts of the top cable block align with the third set of cutouts of the intermediate cable block adjacent the top cable block.

8. The cable bus management block of claim 7 wherein the bottom cable block is seated within the channel of the lower channel support.

\* \* \* \* \*